(12) United States Patent
Okubo

(10) Patent No.: US 6,657,946 B2
(45) Date of Patent: Dec. 2, 2003

(54) PHASE CHANGE TYPE OPTICAL DISK HAVING DIFFERENT REFLECTANCES AT CRYSTALLINE AND AMORPHOUS STATES

(75) Inventor: Shuichi Okubo, Tokyo (JP)

(73) Assignee: NEC Corporation (JP)

( * ) Notice: Subject to any disclaimer, the term of this patent is extended or adjusted under 35 U.S.C. 154(b) by 270 days.

(21) Appl. No.: 09/843,316

(22) Filed: Apr. 25, 2001

(65) Prior Publication Data

US 2001/0055268 A1 Dec. 27, 2001

(30) Foreign Application Priority Data

May 11, 2000 (JP) ........................................ 2000-138814

(51) Int. Cl.$^7$ ................................................ G11B 7/24
(52) U.S. Cl. ................................ 369/275.2; 369/275.1; 428/64.4; 430/270.13
(58) Field of Search ........................... 369/275.2, 275.1, 369/275.4, 13.4; 428/64.4, 64.1, 64.3, 64.2; 430/270.13, 320, 321

(56) References Cited

U.S. PATENT DOCUMENTS

| | | | | |
|---|---|---|---|---|
| 5,974,025 A | * | 10/1999 | Yamada et al. ............. | 369/288 |
| 6,221,455 B1 | * | 4/2001 | Yasuda et al. ............. | 428/64.1 |
| 6,312,780 B1 | * | 11/2001 | Kasami et al. | |
| 6,395,366 B1 | * | 5/2002 | Kim .......................... | 428/64.1 |
| 6,469,977 B1 | * | 10/2002 | Kitaura et al. ........... | 369/275.1 |
| 6,511,788 B1 | * | 1/2003 | Yasuda et al. ......... | 430/270.13 |

FOREIGN PATENT DOCUMENTS

| | | |
|---|---|---|
| JP | 11-167747 | 6/1999 |
| KR | 2001-29133 | 4/2001 |

* cited by examiner

Primary Examiner—Tan Dinh
(74) Attorney, Agent, or Firm—Hayes Soloway P.C.

(57) ABSTRACT

A phase change optical disk has a multilayered structure obtained by sequentially forming at least a lower dielectric layer, recording layer, upper dielectric layer, and reflective layer on a substrate. The reflectance Rc of the disk with respect to light with a wavelength of 380 nm to 430 nm, when the recording layer is in a crystalline state, is lower than the reflectance Ra of the disk when the recording layer is in an amorphous state.

19 Claims, 4 Drawing Sheets

PHASE CHANGE TYPE OPTICAL DISK HAVING DIFFERENT REFLECTANCES AT CRYSTALLINE AND AMORPHOUS STATES

BACKGROUND OF THE INVENTION

The present invention relates to an optical information recording medium on and from which information is written and read by laser beam irradiation and, more particularly, to a phase change optical disk.

Because of the advancement in research and development on the semiconductor laser (to be referred to as LD hereinafter), a blue LD with a wavelength of about 380 nm to 430 nm will soon be put into practical use. The recording density of an optical disk is determined mainly by the focused beam spot size of an optical beam used for writing/reading information. The focused beam spot size is proportional to the wavelength of the LD. Hence, it is expected that the recording capacity of an optical disk will increase greatly by using a blue LD with a wavelength shorter than that of a red LD which has currently been put into practical use.

When a focused beam spot size decreases, the time required for the spot to pass through a certain point on the disk decreases. In a phase change optical disk, this means that the time (holding time) during which the recording layer is held at a crystallization temperature or more decreases.

FIG. 2 shows a result obtained by studying the relationship between the holding time and the spot size by thermal simulation. The holding time is the time during which the recording layer is heated to a range of a crystallization temperature (e.g., 180° C.) or more to a melting point (e.g., 600° C.) or less. From FIG. 2, it is apparent that the spot size and holding time are almost proportional. Hence, if a blue LD is employed, a recording layer with a higher crystallization rate is required.

In a recording layer with a higher crystallization rate, the stability of the amorphous state is usually low. When the disk is stored at room temperature or the like, data recorded by setting the recording layer in the amorphous state may be undesirably erased (crystallized) over time or upon a change in storing condition.

In order to improve the erasure rate when the blue LD is employed, Japanese Patent Laid-Open No. 11-167747 (reference 1) proposes a technique for adding a light absorption adjusting layer. With the technique described in reference 1, a new layer must be added to the conventional phase change optical disk, leading to a decrease in productivity. With this method, when the linear velocity (rotational speed of the disk) is increased in order to improve the information transfer rate, crystallization does not progress sufficiently and the erasure rate decreases.

SUMMARY OF THE INVENTION

It is an object of the present invention to provide a phase change optical disk with a high signal quality, which does not require a particularly new recording layer but has a high erasure rate even when a blue LD is used even at a high linear velocity.

In order to achieve the above object, according to the present invention, there is provided a phase change optical disk with a multilayered structure obtained by sequentially forming at least a lower dielectric layer, recording layer, upper dielectric layer, and reflective layer on a substrate, wherein a reflectance Rc of the disk with respect to light with a wavelength of 380 nm to 320 nm, when the recording layer is in a crystalline state, is lower than a reflectance Ra of the disk when the recording layer is in an amorphous state.

DESCRIPTION OF THE PREFERRED EMBODIMENT

First, the principle of the present invention will be described.

The major factors that determine the erasure rate of a phase change optical disk are:

(1) the difference in reflectance among different crystalline states; and (2) the ratio in absorption index of crystalline state to amorphous state.

Figure 3A:
FIG. 3A is a view showing the initial crystalline state of a recording layer.
Figure 3B:
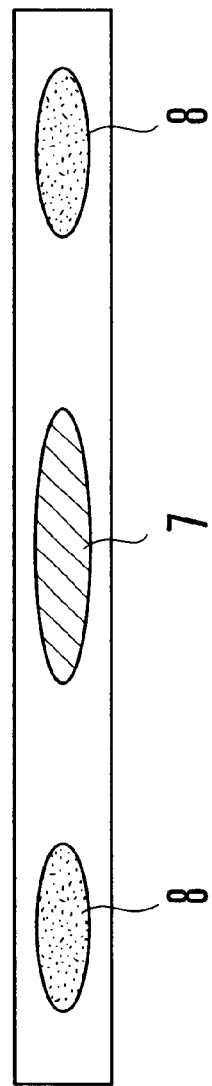
FIG. 3B is a view showing a state wherein erasure power irradiation is performed only once.
Figure 3C:
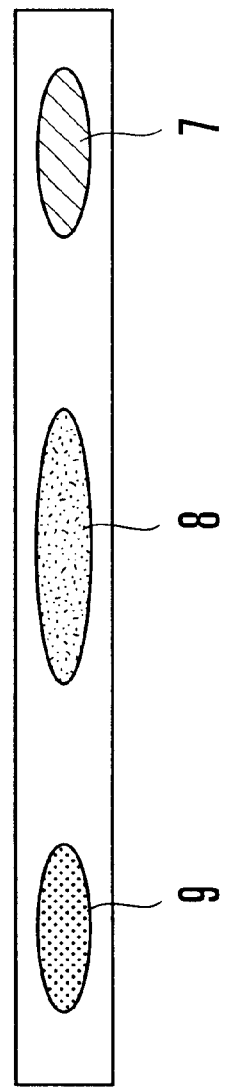
FIG. 3C is a view showing a state wherein the erasure power irradiation is performed twice.

The difference in reflectance (1) will be described. The crystalline state of the recording layer may include three states, as shown in FIGS. 3A to 3C. The state shown in FIG. 3A is an initialized crystalline state. This state is obtained by crystallizing, prior to recording, the recording layer with an initialization unit or the like. The reflectance of the phase change optical disk at this time is defined as Rc.

The state shown in FIG. 3B is a crystalline state obtained when, after a recording mark is formed, it is irradiated once with an erasure power for rewriting information. The reflectance of the phase change optical disk at this time is defined as Rc1. The state shown in FIG. 3C is a state obtained when, to rewrite information again, the recording mark is irradiated with an erasure power again in accordance with the recording data pattern, so crystallization progresses further from the state shown in FIG. 3B. The reflectance of the phase change optical disk at this time is defined as Rc2. Reference numeral 7 denotes a recording mark; 8, an erased crystal portions obtained when the recording mark is irradiated with the erasure power once; and 9, an erased crystal portion obtained when the recording mark is irradiated with the erasure power twice.

When the recording layer is to be irradiated with the erasure power, if the time during which the recording layer is held at a crystallization temperature or more is sufficiently long, crystallization progresses sufficiently with one erasure power irradiation, and accordingly the reflectances Rc1 and Rc2 are not largely different from each other. When, however, a blue LD is used, the holding time decreases, so crystallization does not progress sufficiently with one erasure power irradiation. Then, the difference between the reflectances Rc1 and Rc2 increases to appear as a residual signal, which decreases the erasure rate. The reflectances differ among different crystalline states because the optical constants differ.

In this case, crystalline states obtained by irradiation of the erasure power of up to twice are merely considered. This is because the probability that the erasure power irradiation is performed three times consecutively is not so high, and crystallization progresses sufficiently when irradiation is performed twice and the crystalline state rarely changes even if irradiation is performed three times. In a recording film with such a low crystallization acceleration that crystallization does not progress until it is irradiated three times, a sufficiently high erasure rate is difficult to obtain.

In the present invention, even if the crystalline state of the recording layer changes, a change $\Delta R$ in reflectance=$|Rc1-Rc2|$ becomes as small as possible. Therefore, even if the holding time decreases because a blue LD is used or because of a high linear velocity and crystallization does not progress sufficiently upon being irradiated once with the erasure power, a high erasure rate can be realized. The change $\Delta R$ in reflectance is preferably as small as possible. To satisfy an erasure rate of 26 dB or more generally required in digital recording, $\Delta R/|Rc-Ra|<0.05$ must be satisfied.

This is because, in a phase change optical disk, the signal amplitude is proportional to $|Rc-Ra|$, the residual signal amplitude in erasure is proportional to $\Delta R$, and the erasure rate is expressed by $20 \log_{10}$ (residual signal amplitude/signal amplitude)=$20 \log_{10} (\Delta R/|Rc-Ra|)$. In information rewriting immediately after initialization, the change in reflectance is expressed by $|Rc-Ra|$. When information rewriting is performed a large number of times so the initialized crystalline state disappears, the change in reflectance is expressed by $|Rc1-Rc2|$.

When a recording film with a high crystallization rate is used, or when writing and erasure are performed with a sufficiently low linear velocity, its crystallization progresses sufficiently upon being irradiated once with the erasure power. When writing is performed, sometimes a crystalline state comprised of coarse crystal grains is formed around an amorphous recording mark. As the crystalline state formed around the recording mark during writing has a different optical constant from that of a crystalline state formed by erasure power irradiation, it decreases the erasure rate. Even in this case, the erasure rate can be improved by decreasing the difference in reflectance between the two crystalline states, as is apparent from the above description.

The ratio in absorption index of crystalline state to amorphous state (2) will be described. If an absorption index Aa of a recording layer in the amorphous state is higher than an absorption index Ac in the crystalline state, the length of a mark formed upon being irradiated with a writing power in the crystalline state. In this case, the recording mark is influenced by a previously recorded mark, and its length changes accordingly, thereby decreasing the erasure rate.

If the crystalline state and amorphous state have the same thermal characteristics, the crystalline state and amorphous state are optimally made to have the same absorption index absorption index. In practice, the crystalline state has a higher thermal conductivity and a larger latent heat that accompanies melting. Thus, the absorption index Ac of the crystalline state is preferably set higher than the absorption index Aa of the amorphous state. If, however, the absorption index ratio Ac/Aa is excessively increased more than necessary, the length of the mark recorded in the crystalline state becomes undesirably larger than that of the mark recorded in the amorphous state, and the erasure rate decreases. In the present invention, the absorption index ratio Ac/Aa is set within an appropriate range, so that a change in mark length can be suppressed.

The present invention will be described in detail with reference to the accompanying drawings.

Figure 1:
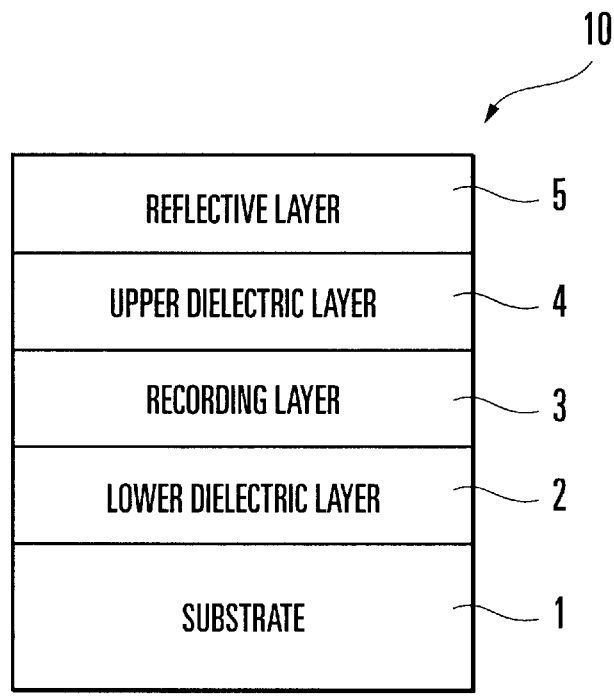
FIG. 1 is a sectional view of the main part of a phase change optical disk according to an embodiment of the present invention.
Figure 2:
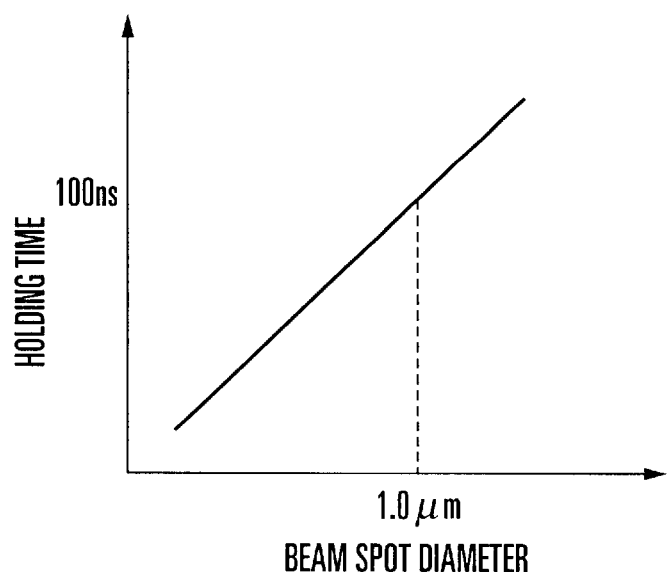
FIG. 2 is a graph showing a result obtained by calculating the relationship between a beam spot diameter and holding time by means of thermal simulation.

FIG. 1 shows the schematic partial sectional structure of a phase change optical disk according to an embodiment of the present invention. This phase change optical disk (to be referred to as an optical disk hereinafter) 10 has a multilayered structure obtained by forming a lower dielectric layer 2, recording layer 3, upper dielectric layer 4, and reflective layer 5 sequentially on a substrate 1. FIG. 1 shows the section of part of the optical disk, and the whole optical disk has a round disk-like shape.

In the optical disk 10, the thickness of the lower dielectric layer 2 is set to $\lambda/(9n)$ or more and $\lambda/(3n)$ or less, and the thickness of the upper dielectric layer 4 is set to $\lambda/(5n)$ or more and $\lambda/(2.5n)$ or less, where n is the refractive index of a dielectric layer with respect to a wavelength $\lambda$. This can realize (reflectance Rc)<(reflectance Ra), so a change in reflectance with respect to a change in optical constant can be suppressed.

When the thickness of the dielectric is changed every $\lambda/(2n)$ from a certain value, the resultant dielectric is optically equivalent to the original one. Thus, the thickness of the dielectric layer described above can be increased every $\lambda/(2n)$. For example, the thickness of the upper dielectric layer 4 can be set to $\lambda/(5n)+\lambda/(2n)$.

Figure 6:
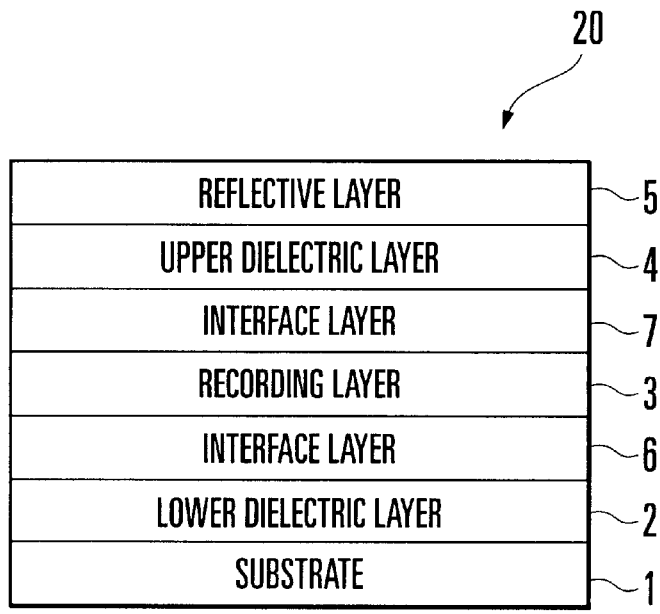
FIG. 6 is a sectional view of the main part of the first modification of the structure of the phase change optical disk shown in FIG. 1.
Figure 7:
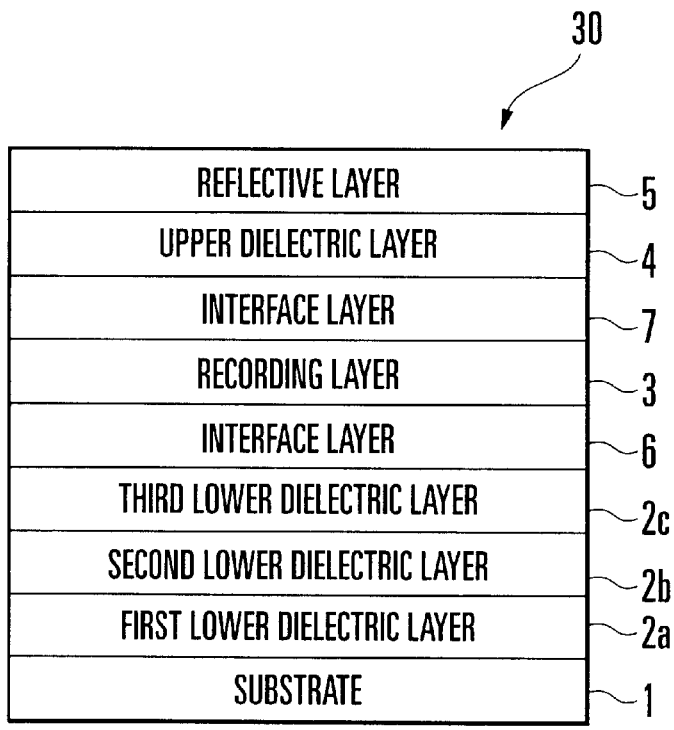
FIG. 7 is a sectional view of the main part of the second modification of the structure of the phase change optical disk shown in FIG. 1.

In the present invention, other than the structure shown in FIG. 1, as shown in FIG. 6, a lower dielectric layer 2, interface layer 6, recording layer 3, interface layer 7, upper dielectric layer 4, and reflective layer 5 may be sequentially formed on a substrate 1. Alternatively, as shown in FIG. 7, a first lower dielectric layer 2a second lower dielectric layer 2b, third lower dielectric layer 2c, interface layer 6, recording layer 3, interface layer 7, upper dielectric layer 4, and reflective layer 5 may be sequentially formed on a substrate 1. In these cases, the degree of freedom in optical design increases by an increase in number of films. Thus, a clear limitation on the thickness of a dielectric layer, which is necessary for realizing (reflectance Rc)<(reflectance Ra), is eliminated.

In either arrangement, it is preferable that the reflectance Rc be 4% or more to 17% or less, and the reflectance Ra be 25% or more. (Reflectance Rc)<(reflectance Ra) is set because it facilitates implementing an arrangement in which a change in reflectance is suppressed with the difference between the reflectances Rc and Ra being left large, and because the lower the reflectance Rc, the more the disk noise can be decreased and the higher the signal quality can be improved.

To suppress a change in reflectance, the reflectance Rc may be set to take a stationary value with respect to a change in optical constant. In other words, the reflectance Rc may take a maximal or minimal value with respect to a reference optical constant. If the reflectance Rc takes a maximal value, it is advantageous in decreasing the disk noise.

If the reflectance Rc is excessively low, problems such as unstable servo may occur. Thus, the reflectance Rc is preferably 4% or more. Conversely, if the reflectance Rc is excessively high, the difference between the reflectances Ra and Rc decreases, and the signal quality decreases. Thus, the reflectance Rc is preferably 17% or less.

The optical characteristics of the optical disk 10 with the sectional structure shown in FIG. 1 will be described.

Figure 4:
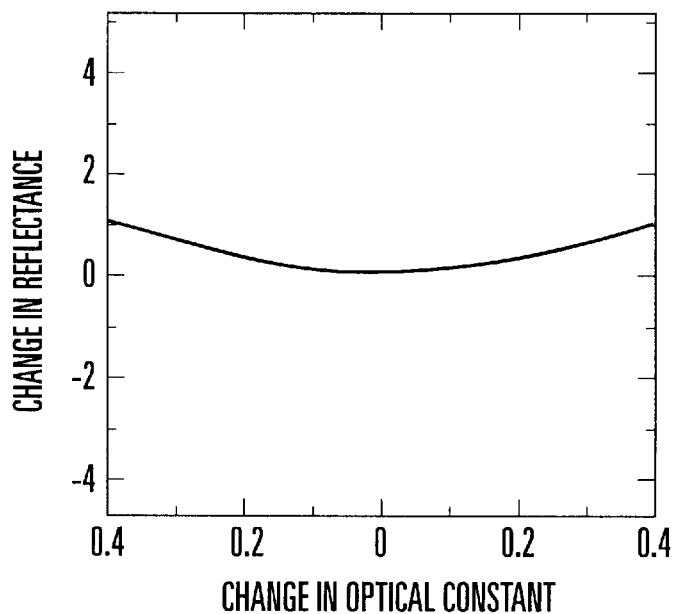
FIG. 4 is a graph showing the optical characteristics of the phase change optical disk shown in FIG. 1.

The optical disk 10 according to the present invention is designed such that when the optical constant of the crystalline state changes, a change in reflectance decreases, as shown in FIG. 4. This is realized by designing the optical disk 10 such that its reflectance takes a stationary value with respect to a change in optical constant.

FIG. 4 shows only a change in extinction factor as a change in optical constant. From experiments, it is confirmed that in a wavelength range of 380 nm to 430 nm, the refractive index is almost constant among different crystalline states, and only the extinction factor changes. As the optical constant serving as the reference of the change, an optical state of a crystalline state initialized by the initialization unit may be used. This is because when crystallization is not sufficient, the extinction factor (corresponding to one erasure power irradiating operation) is smaller than the extinction factor of the initialized crystalline state, and when crystallization has progressed sufficiently, the extinction factor (corresponding to two erasure power irradiating operations) is larger than the optical constant of the initialized crystalline state.

<EXAMPLE 1>

As a substrate 1, a polycarbonate substrate with a groove pitch of 0.8 μm was used. As a lower dielectric layer 2, recording layer 3, upper dielectric layer 4, and reflective layer 5, 30-nm thick ZnS—$SiO_2$, 13-nm thick $Ge_2Sb_2Te_5$, 50-nm thick ZnS—$SiO_2$, and 200-nm thick Al were sequentially formed on the substrate 1 by sputtering, thereby fabricating an optical disk 10 shown in FIG. 1.

In the optical disk 10 fabricated in this manner, the refractive index of ZnS—$SiO_2$ with respect to a wavelength of 400 nm was 2.33. The reflectance of the optical disk 10 of the example 1 with respect to a wavelength of 400 nm was 36% when the recording layer 3 was in the amorphous state, and was 12% when the recording layer 3 was in a crystalline state initialized by the initialization unit. The absorption factor ratio Ac/Aa was 1.4. The optical disk 10 of this example was designed such that its reflectance changes as shown in FIG. 4 when the optical constant of the crystalline state changes.

When the optical constants (refractive index n and extinction factor k) of the crystalline state were measured, they were (3.3, 2.9) in the initialized crystalline state. In a crystalline state formed by irradiating the recording mark with an erasure power once, the optical constants were (3.3, 2.85). In a crystalline state formed by irradiating the recording mark with the erasure power twice, the optical constants were (3.3, 3.05). The axis of abscissa of a change in optical constant shown in FIG. 4 represents a change in extinction factor. As the value 0, k of the initialized crystalline state was used as the reference.

Overwriting was performed by rotating the optical disk 10 at a linear velocity of 5 m/s, using an optical head having a wavelength of 400 nm an objective lens with an NA of 0.6, and with a recording power of 5 mW and an erasure power of 2.5 mW. Overwriting was performed ten times with a signal having a recording frequency of 3.1 MHz and a duty of 50% and a signal having a recording frequency of 3.6 MHz and a duty of 50% alternately. After that, overwriting was performed once with a signal of 3.1 MHz and a signal of 3.6 MHz. The erasure rate was measured. As a result, a high erasure rate of 40 dB or more was obtained. When the linear velocity dependency of the erasure rate of this optical disk 10 was examined, a high erasure rate of 35 dB or more was obtained even with a linear velocity of 8 m/s or more.

<Comparative Example>

For comparison, a substrate as in Example 1 was used. As a lower dielectric layer, recording layer, upper dielectric layer, and reflective layer, 50-nm thick ZnS—$SiO_2$, 13-nm thick $Ge_2Sb_2Te_5$, which is identical to that of Example 1, 28-nm thick ZnS—$SiO_2$, and 200-nm thick Al were sequentially formed on the substrate by sputtering, thereby fabricating an optical disk as a comparative example. In the comparative example, the reflectance with respect to a wavelength of 400 nm was 1% when a recording layer 3 was in the amorphous state, and was 21% in a crystalline state initialized by the initialization unit.

Figure 5:
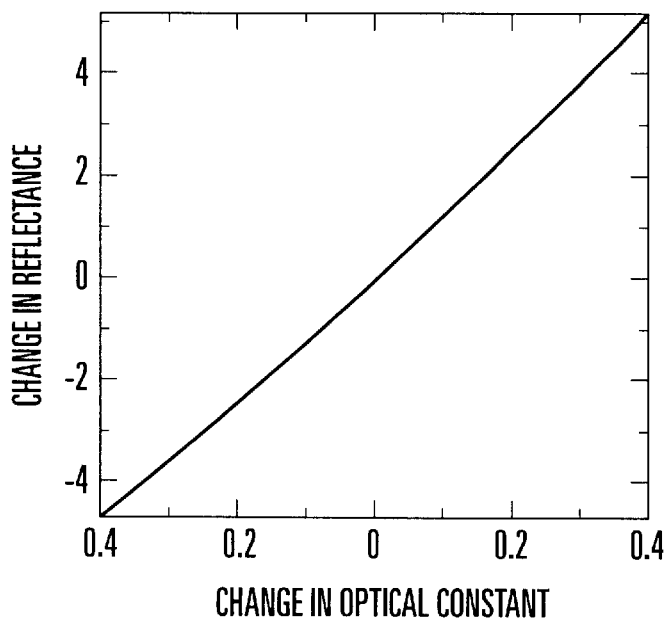
FIG. 5 is a graph showing the optical characteristics of a phase change optical disk as a comparative example.

In the comparative example, when the optical constant of the crystalline state changed, the reflectance exhibited a change shown in FIG. 5. As is apparent from FIG. 5, in the comparative example, when the optical constant of the crystalline state changes, the reflectance changes largely. Reflectances Rc and Ra of the optical disk as the comparative example are equal to those of the conventional general phase change optical disk.

When the erasure rate was measured in accordance with the same measurement procedure as that of Example 1, it was as low as about 20 dB. When the linear velocity dependence of the erasure rate of the optical disk as the comparative example was examined, as the linear velocity increased, the erasure rate degraded monotonically. When the linear velocity was 8 m/s, the erasure rate was as very low as about 10 dB.

<EXAMPLE 2>

A substrate 1 as in Example 1 was used. As a lower dielectric layer 2, interface layer 6, recording layer 3, interface layer 7, upper dielectric layer 4, and reflective layer 5, 25-nm thick ZnS—$SiO_2$, 5-nm thick GeCrN, 13-nm thick $Ge_2Sb_2Te_5$, 5-nm thick GeCrN, 43-nm thick ZnS—$SiO_2$, and 100-nm thick Al were sequentially formed on the substrate 1 by sputtering, thereby fabricating an optical disk 20 shown in FIG. 6.

In the optical disk 20 fabricated in this manner, the refractive indices of ZnS—$SiO_2$ and GeCrN with respect to a wavelength of 400 nm were 2.33 and 2.35, respectively. The reflectance of the optical disk 20 with respect to a wavelength of 400 nm was 37% when the recording layer 3 was in the amorphous state, and was 12% when the recording layer 3 was in a crystalline state initialized by the initialization unit.

The absorption factor ratio Ac/Aa of the optical disk 20 of this example was 1.4. The optical constants (refractive index n and extinction factor k) of the recording film were (3.3, 2.9) in the initialized crystalline state. In a crystalline state formed by irradiating the recording mark with the erasure power once, the optical constants were (3.3, 2.85). In a crystalline state formed by irradiating the recording mark with the erasure power twice, the optical constants were (3.3, 3.05).

The optical disk 20 is designed such that its reflectance is 12.2% when the optical constants are (3.3, 2.85) and 11.5% when the optical constants are (3.3, 3.05). When the erasure rate of the optical disk of this example was measured in accordance with the same procedure as that of Example 1, a high erasure rate of 40 dB or more was obtained.

<EXAMPLE 3>

A substrate 1 as in Example 1 was used. As a first lower dielectric layer 2a, second lower dielectric layer 2b, third lower dielectric layer 2c, recording layer 3, upper dielectric layer 4, and reflective layer 5, 55-nm thick ZnS—SiO$_2$, 50-nm thick SiO$_2$, 30-nm thick ZnS—SiO$_2$, 13-nm thick Ge$_2$Sb$_2$Te$_5$, 30-nm thick ZnS—SiO$_2$, and 100-nm thick Al were sequentially formed on the substrate 1 by sputtering, thereby fabricating the optical disk of this example. This optical disk has a structure identical to that of the optical disk of FIG. 7 but with the interface layers 6 and 7 being omitted.

In the optical disk of this example fabricated in this manner, the refractive indices of ZnS—SiO$_2$ and SiO$_2$ with respect to a wavelength of 400 nm were 2.33 and 1.5, respectively. The reflectance of the optical disk of this example with respect to a wavelength of 400 nm was 33% when the recording layer was in the amorphous state, and was 7% when the recording layer was in a crystalline state initialized by the initialization unit.

The absorption factor ratio Ac/Aa of the optical disk of this example was 1.45. The optical constants (refractive index n and extinction factor k) of the recording film were (3.3, 2.9) in the initialized crystalline state. In a crystalline state formed by irradiating the recording mark with the erasure power once, the optical constants were (3.3, 2.85). In a crystalline state formed by irradiating the recording mark with the erasure power twice, the optical constants were (3.3, 3.05).

The optical disk of this example is designed such that its reflectance is 6.6% when the optical constants are (3.3, 2.85) and 7.3% when the optical constants are (3.3, 3.05). When the erasure rate of the optical disk of this example was measured in accordance with the same procedure as that of Example 1, a high erasure rate of 40 dB or more was obtained.

<EXAMPLE 4>

A substrate 1 as in Example 1 was used. As a first lower dielectric layer 2a, second lower dielectric layer 2b, third lower dielectric layer 2c, interface layer 6, recording layer 3, interface layer 7, upper dielectric layer 4, and reflective layer 5, 55-nm thick ZnS—SiO$_2$, 50-nm thick SiO$_2$, 30-nm thick ZnS—SiO$_2$, 5-nm thick AlN, 13-nm thick Ge$_2$Sb$_2$Te$_5$, 5-nm thick AlN, 25-nm thick ZnS—SiO$_2$, and 100-nm thick Al were sequentially formed on the substrate 1 by sputtering, thereby fabricating an optical disk 30 shown in FIG. 7.

In the optical disk 30 fabricated in this manner, the refractive indices of ZnS—SiO$_2$, SiO$_2$, and AlN with respect to a wavelength of 400 nm were 2.33, 1.5, and 2.2, respectively. The reflectance of this phase change optical disk with respect to a wavelength of 400 nm was 32% when the recording layer was in the amorphous state, and was 6% when the recording layer was in a crystalline state initialized by the initialization unit.

The absorption factor ratio Ac/Aa of the optical disk of this example was 1.45. The optical constants (refractive index n and extinction factor k) of the recording film were (3.3, 2.9) in the initialized crystalline state. In a crystalline state formed by irradiating the recording mark with the erasure power once, the optical constants were (3.3, 2.85). In a crystalline state formed by irradiating the recording mark with the erasure power twice, the optical constants were (3.3, 3.05).

The optical disk of this example is designed such that its reflectance is 5.8% when the optical constants are (3.3, 2.85) and 6.2% when the optical constants are (3.3, 3.05). When the erasure rate of the optical disk of this example was measured in accordance with the same procedure as that of the example 1, a high erasure rate of 40 dB or more was obtained.

<EXAMPLE 5>

An optical disk with a structure obtained by forming a first lower dielectric layer 2a, second lower dielectric layer 2b, third lower dielectric layer 2c, recording layer 3, upper dielectric layer 4, and reflective layer 5 sequentially on a substrate 1 was fabricated. The optical disk of this example has the same multilayered structure as that of Example 3. In the optical disk of this example, the absorption factor ratio Ac/Aa was changed within a range of 1.0 to 1.8, and the erasure rate was examined. In the optical disk of this example, $\Delta R/|Rc-Ra|$ is designed as shown in Table 1. As is apparent from Table 1, when the absorption factor ratio Ac/Aa is in the range of 1.1 or more to 1.7 or less, the erasure rate is 26 dB or more.

TABLE 1

| Ac/Aa | 1.0 | 1.1 | 1.4 | 1.6 | 1.7 | 1.7 | 1.8 |
|---|---|---|---|---|---|---|---|
| $\Delta R/|Rc - Ra|$ | 0.05 | 0.05 | 0.02 | 0.03 | 0.05 | 0.06 | 0.05 |
| Erasure Rate (dB) | 25 | 28 | 38 | 32 | 27 | 25 | 24 |

As has been described above, According to the present invention, when the reflectance Rc in the crystalline state with respect to light with a wavelength of 380 nm to 430 nm is decreased to be lower than the reflectance Ra in the amorphous state, a very high erasure rate can be realized without using a particularly new material even when a blue LD is used at a high linear velocity.

If the reflectance Rc is set in a range of 4% or more to 17% or less, the reflectance Ra is set to 25% or more, the thickness of the lower dielectric layer is set to $\lambda/(9n)$ or more and $\lambda/(3n)$ or less, the thickness of the upper dielectric layer is set to $\lambda/(5n)$ or more and $\lambda/(2.5n)$ or less, where n is the refractive index of the dielectric layer wit LD is used, high-density a wavelength $\lambda$ of 380 nm to 430 nm, and a change $\Delta Rc$ in reflectance satisfies $\Delta Rc/|Rc-Ra|<0.05$, when a very high erasure rate of 40 db or more was obtained.

When another interface layer is added or he dielectric layer has a multilayered structure as well, a very high erasure rate of 40 dB more can be obtained also. Since the reflectance Rc is low, the disk noise is decreased, so the signal quality can be improved. When a short-wavelength blue LD is used, high-density recording can be performed.

What is claimed is:

1. A phase change optical disk with a multilayered structure obtained by sequentially forming at least a lower dielectric layer, recording layer, upper dielectric layer, and reflective layer on a substrate, wherein a thickness of said lower dielectric layer is set to not less than $\lambda/(9n)$ and not more than $\lambda/(3n)$ and a thickness of said upper dielectric layer is set to not less than $\lambda/(5n)$ and not more than $\lambda/(2.5n)$ where n is a refractive index of said dielectric layer with respect to a wavelength $\lambda$ of not less and 380 nm to not more than 430 nm, and $$\Delta Rc/|Rc-Ra|<0.05$$

is satisfied where $\Delta Rc$ is a change in reflectance Rc that takes place when a crystalline state of said recording layer changes depending on information recording/erasing condition, so that the reflectance Rc of said disk with respect to light with a wavelength of 380 nm to 430 nm, when said recording layer is in the crystalline state, is set lower than a reflectance Ra of said disk when said recording layer is in an amorphous state.

2. A phase change optical disk with a multilayered structure obtained by sequentially forming at least a lower dielectric layer, recording layer, upper dielectric layer, and reflective layer on a substrate (1), wherein a reflectance Rc of said disk with respect to light with a wavelength of 380 nm to 430 nm, when said recording layer is in a crystalline state, is lower than a reflectance Ra of said disk when said recording layer is in an amorphous state, and wherein the reflectance Rc is not less than 4% and not more than 17%, and the reflectance Ra is not less than 25%.

3. A disk according to claim 2, wherein a condition:

$$\Delta Rc/|Rc-Ra|<0.05$$

is satisfied where $\Delta Rc$ is a change in reflectance Rc that takes place when the crystalline state of said recording layer changes depending on an information recording/erasing condition.

4. A disk according to claim 2, wherein
a thickness of said lower dielectric layer is set to not less than $\lambda/(9n)$ and not more than $\lambda/(3n)$ where n is a refractive index of said dielectric layer with respect to a wavelength $\lambda$ of not less than 380 nm and not more than 430 nm, and
a thickness of said upper dielectric layer is set to not less than $\lambda/(5n)$ and not more than $\lambda/(2.5n)$.

5. A disk according to claim 2, wherein an interface layer is further formed between said lower dielectric layer and said recording layer, and between said recording layer and said upper dielectric layer.

6. A disk according to claim 2, wherein said lower dielectric layer is comprised of a first lower dielectric layer, second lower dielectric layer, and third lower dielectric layer.

7. A disk according to claim 2, wherein:
said lower dielectric layer is comprised of a first lower dielectric layer, second lower dielectric layer, and third lower dielectric layer, and
an interface layer is further formed between said third lower dielectric layer and said recording layer, and between said recording layer and said upper dielectric layer.

8. A disk according to claim 2, wherein a ratio Ac/Aa of an absorption factor Ac of said recording layer in a crystalline state to a light absorption factor Aa of said recording layer in an amorphous state satisfies:

$$1.1<Ac/Aa<1.7.$$

9. A phase change optical disk with a multilayered structure obtained by sequentially forming at least a lower dielectric layer, recording layer, upper dielectric layer, and reflective layer on a substrate (1), wherein
a reflectance Rc of said disk with respect to light with a wavelength of 380 nm to 430 nm, when said recording layer is in a crystalline state, is lower than a reflectance Ra of said disk when said recording layer is in an amorphous state, and
wherein a condition:

$$\Delta Rc/|Rc-Ra|<0.05$$

is satisfied where $\Delta Rc$ is a change in reflectance Rc that takes place when the crystalline state of said recording layer changes depending on an information recording/erasing condition.

10. A disk according to claim 9, wherein
a thickness of said lower dielectric layer is set to not less than $\lambda/(9n)$ and not more than $\lambda/(3n)$ where n is a refractive index of said dielectric layer with respect to a wavelength $\lambda$ of not less than 380 nm and not more than 430 nm, and
a thickness of said upper dielectric layer is set to not less than $\lambda/(5n)$ and not more than $\lambda/(2.5n)$.

11. A disk according to claim 9, wherein an interface layer is further formed between said lower dielectric layer and said recording layer, and between said recording layer and said upper dielectric layer.

12. A disk according to claim 9, wherein said lower dielectric layer is comprised of a first lower dielectric layer, second lower dielectric layer, and third lower dielectric layer.

13. A disk according to claim 9, wherein
said lower dielectric layer is comprised of a first lower dielectric layer, second lower dielectric layer, and third lower dielectric layer, and
an interface layer is further formed between said third lower dielectric layer and said recording layer, and between said recording layer and said upper dielectric layer.

14. A disk according to claim 9, wherein a ratio Ac/Aa of an absorption factor Ac of said recording layer in a crystalline state to a light absorption factor Aa of said recording layer in an amorphous state satisfies:

$$1.1<Ac/Aa<1.7.$$

15. A phase change optical disk with a multilayered structure obtained by sequentially forming at least a lower dielectric layer, recording layer, upper dielectric layer, and reflective layer on a substrate (1), wherein
a reflectance Rc of said disk with respect to light with a wavelength of 380 nm to 430 nm, when said recording layer is in a crystalline state, is lower than a reflectance Ra of said disk when said recording layer is in an amorphous state, and
wherein a thickness of said lower dielectric layer is set to not less than $\lambda/(9n)$ and not more than $\lambda/(3n)$ where n is a refractive index of said dielectric layer with respect to a wavelength $\lambda$ of not less than 380 nm and not more than 430 nm, and
a thickness of said upper dielectric layer is set to not less than $\lambda/(5n)$ and not more than $\lambda/(2.5n)$.

16. A disk according to claim 15, wherein an interface layer is further formed between said lower dielectric layer and said recording layer, and between said recording layer and said upper dielectric layer.

17. A disk according to claim 15, wherein said lower dielectric layer is comprised of a first lower dielectric layer, second lower dielectric layer, and third lower dielectric layer.

18. A disk according to claim 15, wherein
said lower dielectric layer is comprised of a first lower dielectric layer, second lower dielectric layer, and third lower dielectric layer, and
an interface layer is further formed between said third lower dielectric layer and said recording layer, and between said recording layer and said upper dielectric layer.

19. A disk according to claim 15, wherein a ratio Ac/Aa of an absorption factor Ac of said recording layer in a crystalline state to a light absorption factor Aa of said recording layer in an amorphous state satisfies:

$$1.1<Ac/Ac<1.7.$$

* * * * *